United States Patent
Nakahara

[11] Patent Number: 5,803,328
[45] Date of Patent: Sep. 8, 1998

[54] BICYCLE AEROBAR BAG

[76] Inventor: Toshikazu Nakahara, 4-8-25 Aotani-cho Nada-ku, Kobe, Japan, 657

[21] Appl. No.: 779,714

[22] Filed: Jan. 7, 1997

[51] Int. Cl.$^6$ ................................ B62J 7/06; B62J 11/00
[52] U.S. Cl. ...................... 224/420; 224/414; 224/437; 224/439; 224/463; 74/551.8; D12/409; D12/411
[58] Field of Search ........................ 224/414, 419, 224/420, 428, 431, 432, 436, 437, 439, 440, 463; 280/288.4; 74/551.1, 551.8; D12/400, 402, 407, 409, 411

[56] References Cited

U.S. PATENT DOCUMENTS

| D. 346,489 | 5/1994 | Bean et al. | D12/407 |
|---|---|---|---|
| 609,690 | 8/1898 | Mayerson | 74/551.8 |
| 610,251 | 9/1898 | Wall | 224/432 |
| 4,056,219 | 11/1977 | Hine, Jr. | 224/431 |
| 4,066,196 | 1/1978 | Jackson et al. | 224/431 |
| 4,260,086 | 4/1981 | Hine, Jr. et al. | 224/431 |
| 4,440,332 | 4/1984 | Kullen | 224/439 |
| 4,720,027 | 1/1988 | Board | 224/463 |
| 5,163,339 | 11/1992 | Giard, Jr. et al. | 74/551.8 |
| 5,407,111 | 4/1995 | Lanouette et al. | 224/420 |
| 5,497,920 | 3/1996 | Moeller et al. | |

OTHER PUBLICATIONS

Author Unknown, "Choose Your Weapon," Flite Controls: The Unfair Advantage brochure, date unknown, publisher: Flite Controls, California.

*Primary Examiner*—Allan N. Shoap
*Assistant Examiner*—Gregory M. Vidovich

[57] ABSTRACT

The bag includes a cylindrical portion for a water bottle and a parallelepiped portion for food such as energy bars. Such shapes minimize the size of the bag and hence its weight and air resistance. The bag is elongate to maximize its size yet minimize air resistance. The tethers or straps which connect the bag to the aerobar extend from each of the receptacle portions to support such independently and are disposed at different levels so as to attach to portions of the bar which are oblique relative to each other. One tether or strap is connectable to the conventional handle bar to minimize longitudinal movement of the bag, while the other tethers or straps minimize lateral movement. The straps are adjustable in length to accommodate different aerobars of different widths. The cylindrical bag portion includes a perimeter portion drawable about such cylindrical bag portion to keep an article such as a water bottle tightly in such receptacle portion. The bag is formed of a mesh to minimize the collection of moisture, permit the contents of the bag to be visible, and to minimize the weight of the bag.

6 Claims, 7 Drawing Sheets

BICYCLE AEROBAR BAG

BACKGROUND OF THE INVENTION

The present invention relates generally to bags, particularly to bags for bicycles, and specifically to bags for aerobars.

A cyclist either in training or competition may spend a great amount of time on his or her bike in the course of a day. For example, in triathlons such as the Ironman in Hawaii or in road races such as the Tour de France, it is common to spend two to five hours on one's bike. Besides carrying water or a sports drink on his or her bicycle, the biker takes along his or her own food supply such as bars or gels which are easily digestible so as to move quickly into the blood stream. Unfortunately, the bars or gels are often carried on the bike in inconvenient locations such as in bags underneath the seat. Moreover, to preserve precious seconds and avoid perhaps dangerous accidents, some bikers have been known to unwrap the bars prior to competition and stick the bar on an easily accessible—but perhaps unsanitary—portion of the frame of the bicycle.

Of course, time is of essence in cycling competition. One recent advance in bike racing is the placement of "aerobars" on the conventional handle bar of the bicycle. An aerobar arrangement is a pair of elongate bars extending forwardly of the conventional bars. The elongate bars have a base portion proximal to the conventional bars and a distal oblique portion which bend upwardly from the base portion. At their terminal end portions, the distal oblique portions may be connected by a small U-shape piece having ergonomic impressions formed therein for receiving the thumbs of the rider.

Aerobars place the rider in an aerodynamic position which offers minimal air resistance so that the rider may bike more efficiently. Any large body movements of the rider such as to reach behind for water or food to bring himself of herself out of his or her aerodynamic position increases air resistance.

SUMMARY OF THE INVENTION

A general object of the present invention is to provide a unique bag for placement between aerobars of a bicycle.

Another object of the invention is to provide, in such a bag, unique bag or receptacle portions. Specifically, a first receptacle portion is shaped in a cylindrical form so as to receive a water bottle therein and a second receptacle portion is shaped in the form of a parallelepiped so as to have a shape convenient for food such as food bars, energy bars, candy bars or bananas. Other possible items to be carried in the first receptacle portion include radios, inhalers or atomizers such as metered dose inhalers, gloves and cellular phones.

Another object of the invention is to uniquely place the receptacle portions fore and aft of one another. Such an elongate orientation minimizes wind resistance while maximizing bag space. The bag preferably extends from a location adjacent the conventional handle bar, through and beyond the base portions of the elongate aerobars, to a location between the oblique, distal end portions of the aerobar arrangement. Preferably the first receptacle portion or food box is placed in front of the second receptacle portion for the water bottle since water is required more often than food and to permit a straw extending from the water bottle to be of minimal length and close to the mouth of the rider.

Another object of the invention is to provide, in such a bag, unique tethers or straps adapted for the unique shape of the aerobar arrangement. A first set of tethers extends to the elongate base portions of the aerobar arrangement and a second set of tethers are disposed in a plane above the first set of tethers so as to extend to the oblique distal end portions and maintain the bag in a generally horizontal orientation.

Another object of the invention is to uniquely provide for minimal longitudinal and lateral movement of the bag relative to the aerobar arrangement. The first and second set of tethers or straps, each set of which includes a tether extending from opposite sides of the bag, minimize lateral movement of the bag relative to the frame. A third tether extends from the bag at generally a right angle relative to the first and second sets of tethers to minimize longitudinal movement of the bag.

Another object of the invention is to provide, in such a bag, a unique fourth tether or strap. Such a tether is engaged at least partially about a perimeter of the first receptacle intended for carrying a water bottle and may be drawn tightly about the receptacle portion to tightly engage the water bottle in such receptacle portion.

Another object of the invention is to provide a unique fifth set of tethers or straps. This fifth set of tethers extends from the first receptacle portion, with each fifth tether extending from an opposite side of the first receptacle portion and spaced from a first tether. The first and fifth tethers hold the otherwise flexible and bundable bag in an open position so as to permit an article such as a water bottle to be inserted and withdrawn from the first receptacle portion.

Another object of the invention is to uniquely utilize a mesh material for the bag. Mesh floor portions of the bag minimize the collection of moisture in the bag and hence provide for a more sanitary bag. Mesh side portions of the bag permit the contents of the bag to be visible, as well as minimizing the collection of moisture and providing for a sanitary bag. A mesh cover for the second receptacle portion permits the contents of the bag to be visible. A mesh bag as a whole, including a mesh divider between the first and second receptacle portions, permits the bag to be easily washed, such as sprayed with a hose. Preferably the mesh is a nylon material.

Another object of the invention is that all of the tethers or straps are uniquely adjustable in length or variable in effective length. Accordingly, the bag may be engaged to aerobar arrangements of different widths and the fourth tether may tightly engage water bottles or other articles of different circumferences.

Another object of the invention is to uniquely provide for tethers or straps which are of a quick attach and release type. Hence adjustments to the bag can be made on the run with one hand.

Another object of the invention is to provide a unique cover to a bag which may be opened and closed with one hand. Specifically, the cover includes a connector of the quick attach and release type such as a hook and loop fastener (Velcro®). The bag is zipperless as zippers—except for the most dexterous—must be opened and closed with two hands, a dangerous activity on a bicycle especially at high speeds. Further, since the cover is of the mesh type, the cover is less likely to close under wind pressure or remain open under wind pressure if oriented in an opposite fashion.

Another object of the invention is to uniquely offset the openings of the receptacle portions. Such an offset customizes the bag for the aerobar arrangement by permitting the tethers to engage bag edges forming the openings and extend to portions of the aerobar arrangement disposed at different levels.

Advantageously, the bag is accessible to the rider while the rider is in his or her position over the aerobar, is securely engaged to the aerobar, is adaptable for aerobar arrangements of different widths, offers little wind resistance while lending a relatively large volume for storage of fluid and food, is customized for the shape of water bottles and bars, tightly holds an article in a receptacle portion even where such receptacle portion includes an open top, holds a flexible opening in an open position, may be opened with one hand, may be adjusted relative to the aerobar arrangement with one hand, minimizes the collection of moisture, is sanitary, is washable by convenient methods such as spraying, is flexible so as to be bundable for storage, and is lightweight.

These and further objects and advantages of the present invention will become clearer in light of the following detailed description of the illustrative embodiments of this invention described in connection with the drawings.

BRIEF DESCRIPTION OF THE DRAWINGS

The illustrative embodiments may be best described by reference to the accompanying drawings where.

Figure 1:
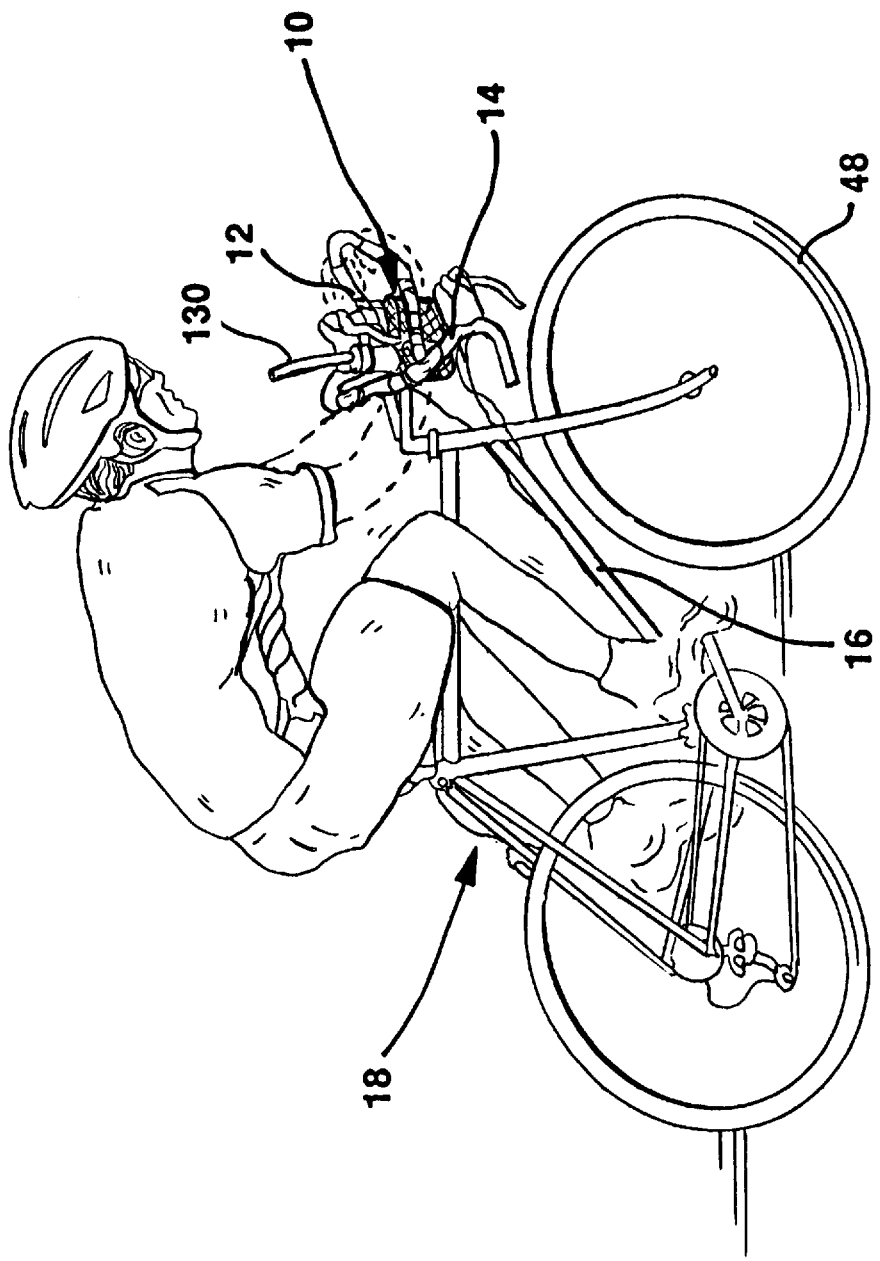
FIG. 1 shows an environmental view of the aerobar bag of the present invention engaged to and between the elongate bars of an aerobar arrangement on a bicycle.

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "inner", and "outer", and similar terms are used herein, it should be understood that these terms have reference only to the structure shown in the drawings as it would appear to a person viewing the drawings and are utilized only to facilitate describing the preferred embodiments.

DESCRIPTION

As shown in FIG. 1, the present aerobar bag is indicated in general by the reference numeral 10 and is engaged to and between an aerobar arrangement 12 which is affixed to a conventional handle bar 14, which in turn is affixed to the frame 16 of a bicycle 18.

Figure 2:
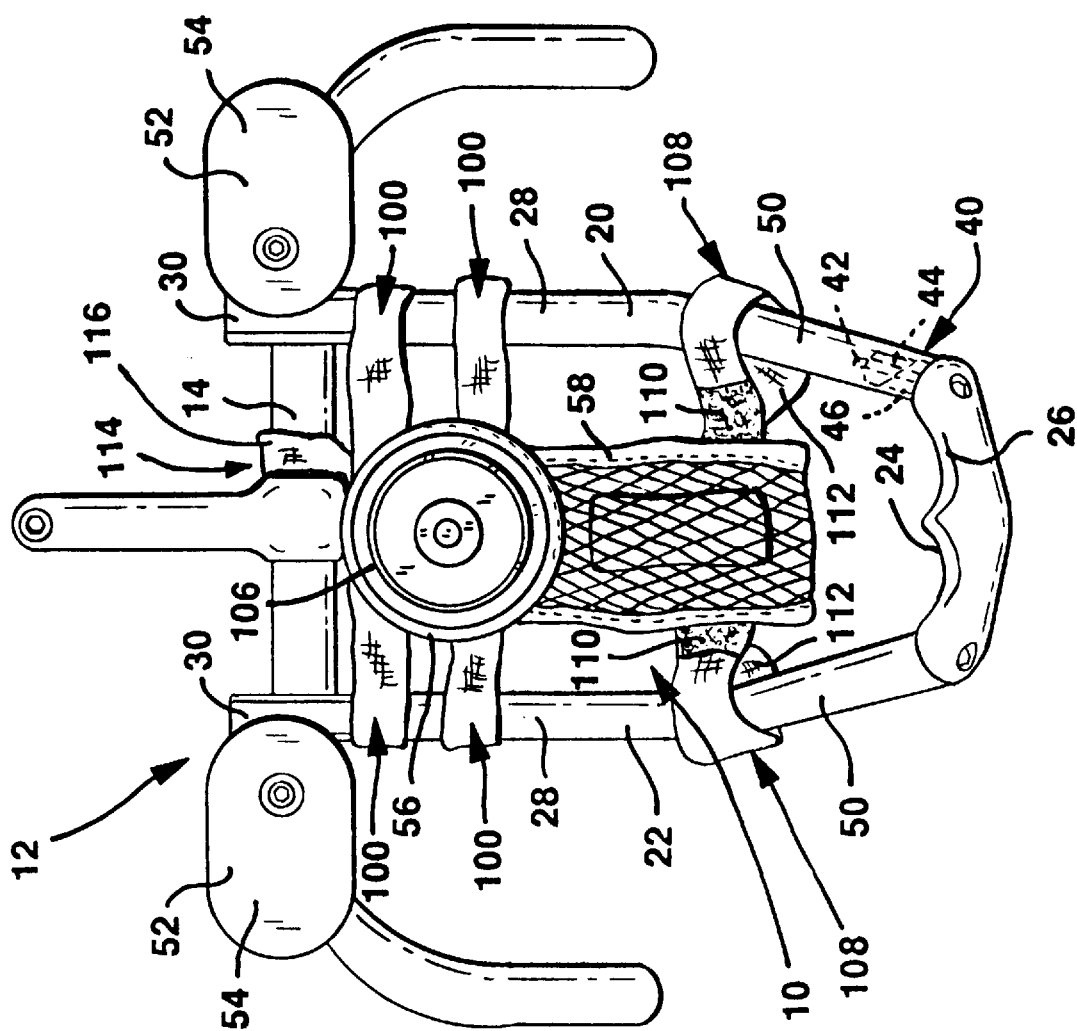
FIG. 2 shows a detail top view of the aerobar arrangement and the aerobar bag of FIG. 1 with the aerobar bag containing a water bottle and a food bar.
Figure 3:
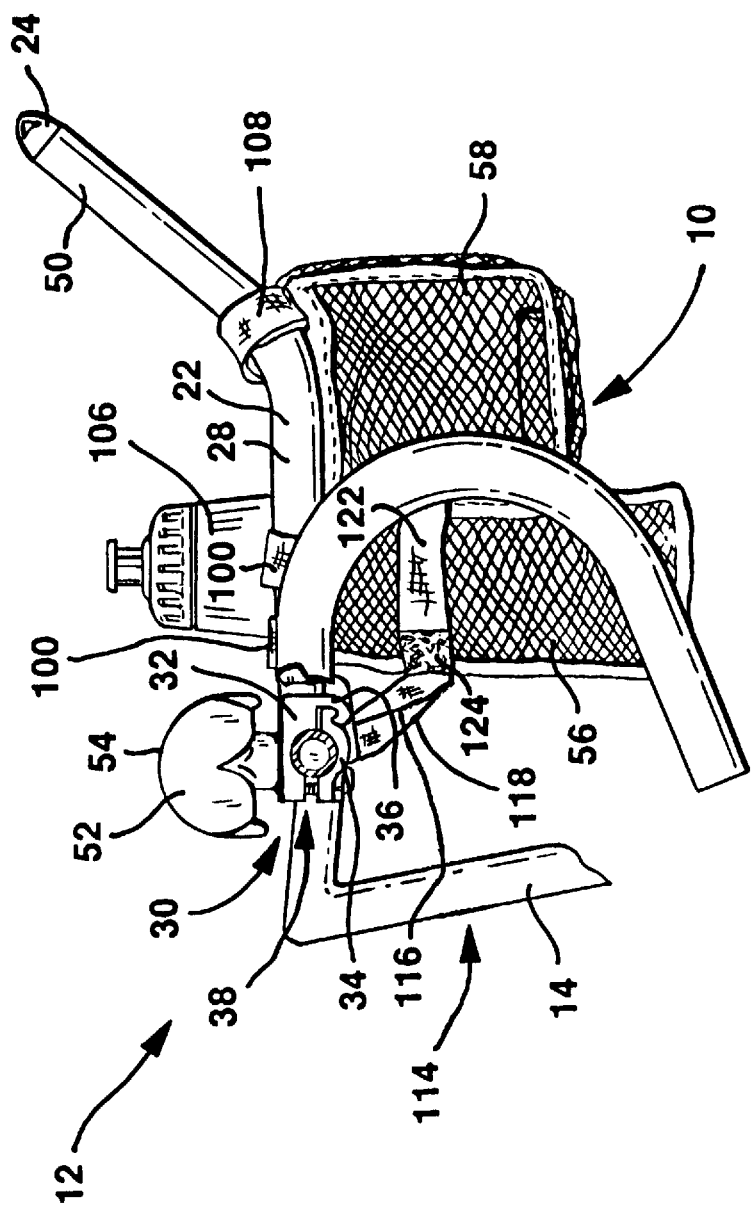
FIG. 3 shows a detail side view of the aerobar arrangement and aerobar bag shown in FIG. 2.
Figure 4:
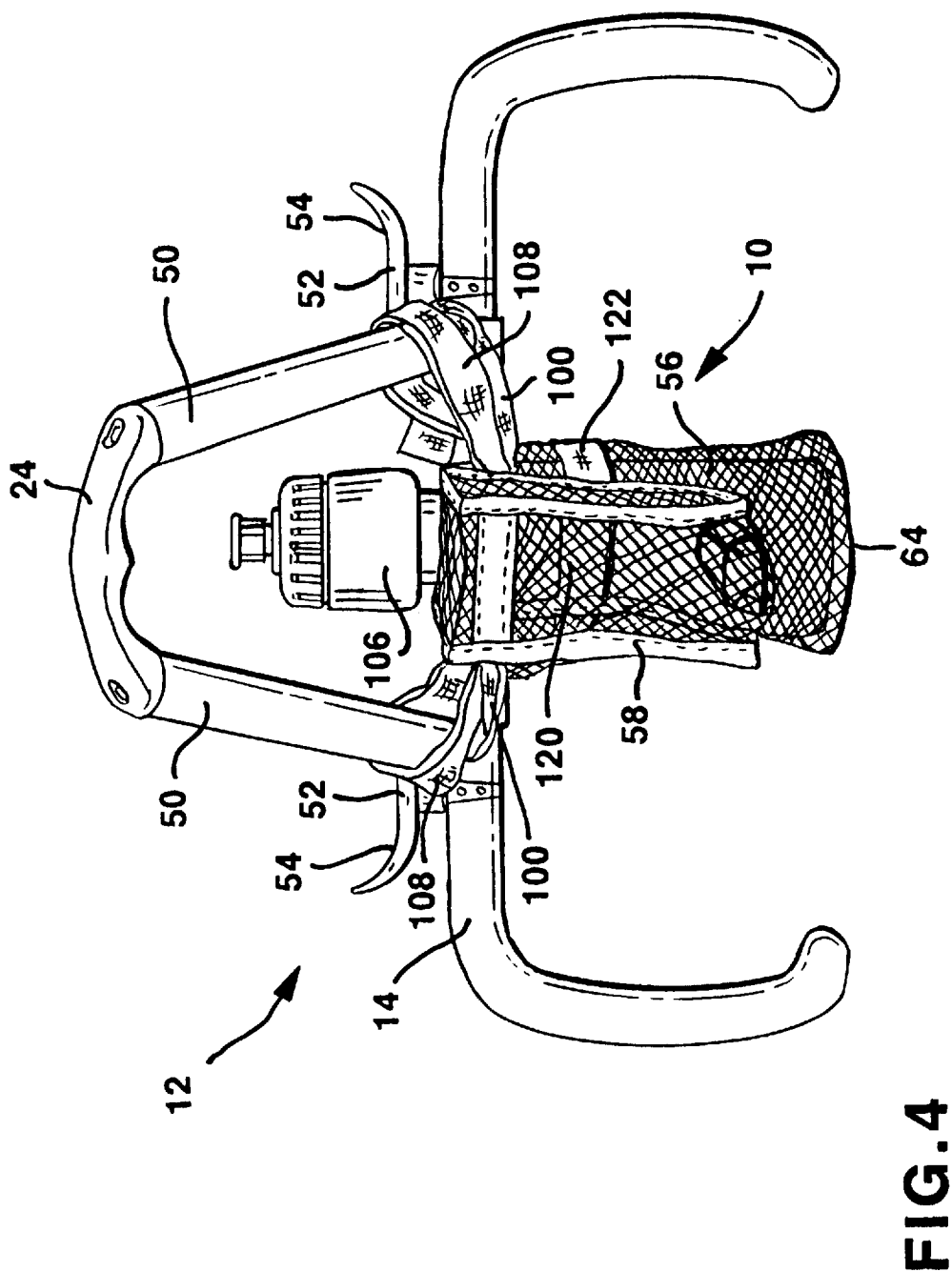
FIG. 4 shows a detail front view of the aerobar arrangement and the aerobar bag shown in FIGS. 2 and 3.
Figure 5:
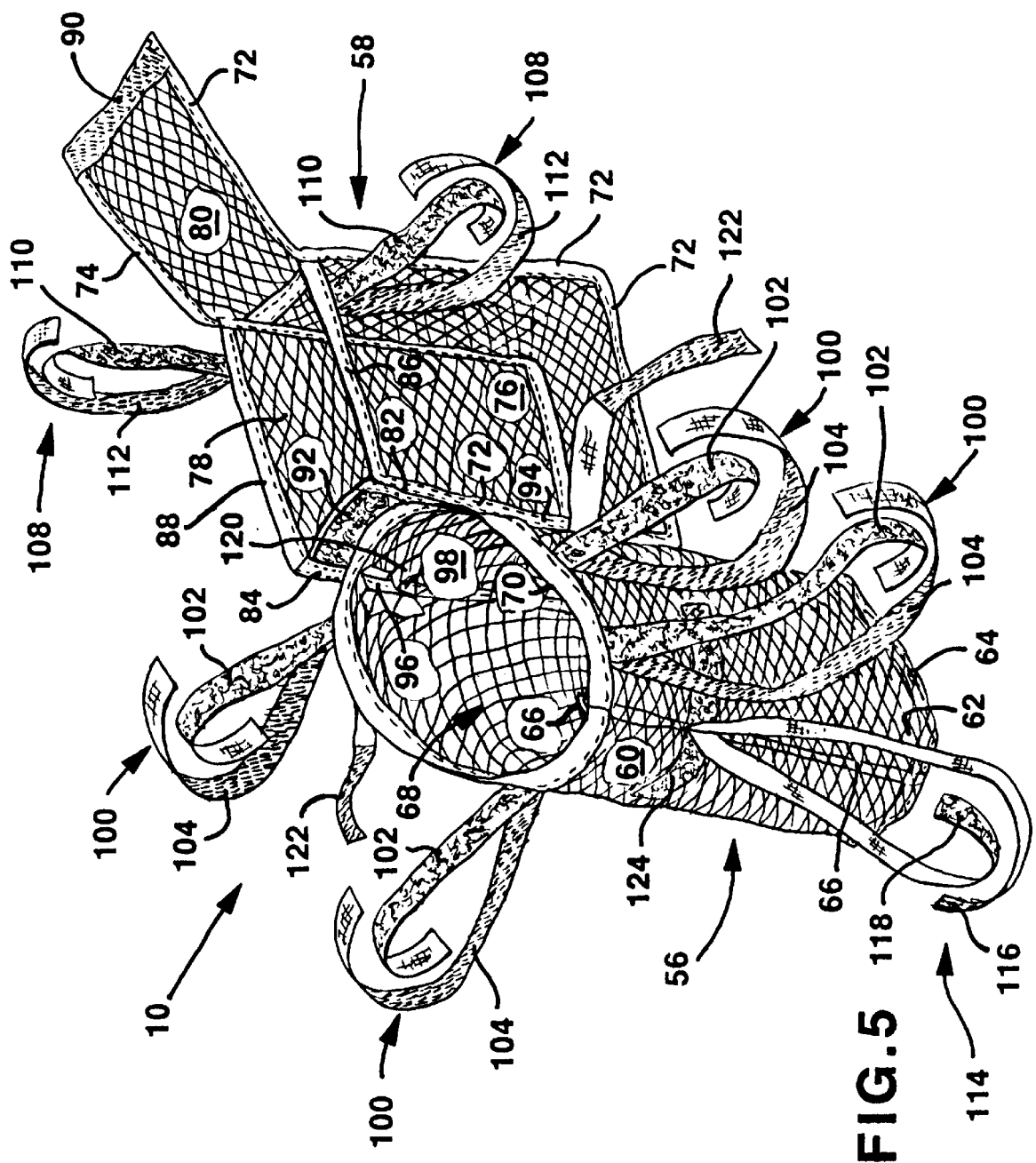
FIG. 5 shows a detail perspective view of the aerobar bag of FIGS. 1–4 without the water bottle and food articles.

As shown in greater detail in FIGS. 2, 3, and 4, the aerobar arrangement 12 generally includes a pair of opposite elongate hollow bars 20, 22 joined at their distal ends by a relatively small, generally U-shaped, readily removable piece 24 which may be ergonomically formed so as to have impressions 26 for the thumbs of a rider. More specifically, each of the elongate bars 20, 22 includes an elongate, relatively straight, proximal bar portion 28 engaged to and proximal to the conventional handle bar 14. At its proximal end, each of the proximal bar portions 28 includes a clamp or connector 30 for affixing the aerobar arrangement 12 to the conventional handle bar 14. The clamp 30 includes an upper portion 32 rigidly fixed to its respective proximal bar portion 28 and a lower portion 34. The portions 32, 34 interlock each other at one end via an S-connection 36 and at the other end via a threaded pin connector and threaded aperture connection 38. Such a clamp or connector 30 is readily operated and may, for example, be loosened so as to slide the elongate bars 20 and 22 closer to or further apart from each other. Along with such an adjustment, the U-shaped piece 24 may be replaced with another U-shaped piece of lesser or greater width. It can be noted that the U-shaped piece 24 has a pair of expandable inserts 40 which slide into the hollow elongate bars 20 and 22. The inserts 40 are expandable by turning pin connectors 42 so as move insert portions 44 and 46 apart so as to frictionally hold the inserts 40 within the hollow elongate bars 20 and 22.

From its proximal end, each of the proximal bar portions 28 extends forwardly of the conventional handle bar 14 so as to extend over a front tire 48 of the bicycle 18. The proximal bar portions 28 are generally parallel to each other or extend slightly inwardly toward each other. The proximal bar portions 28 lie in generally the same plane as the main straight bar portion of the conventional handle bar 14 and further he in a generally horizontal plane. At their distal ends, each of the proximal portions 28 is integral with a respective oblique distal bar portion 50. Oblique distal bar portions 50 extend obliquely upwardly therefrom and obliquely toward each other to their respective distal ends where the oblique distal bar portions 50 are joined to the U-shaped piece 24. The hands of the rider typically engage the oblique distal bar portions 50 and/or the U-shaped piece 24 to place the rider in the desired aerodynamic position.

The aerobar arrangement 12 may further include a pair of arm rests 52. Each of the arm rests 52, for the elbows or rear portions of the forearms of the rider, is clamped to the conventional handle bar 14. Each of the arm rests 52 preferably includes pads 54.

The aerobar bag 10 is engaged to and between the elongate bars 20 and 22 and to the conventional handle bar 14. The aerobar bag 10 includes a first receptacle portion 56 and a second receptacle portion 58, each of which is of a size sufficient to permit the insertion of a hand of an average sized adult: The first receptacle portion 56 is generally formed in a cylindrical shape. The first receptacle portion 56 includes a cylindrical sidewall portion 60 formed of a nylon mesh material and a disk shaped floor portion 62 formed of the same nylon mesh material. A lower horizontal circular seam strip 64 formed of a nylon joins the sidewall portion 60 to the floor portion 62. The lower circular seam strip 64 is disposed on the inner cylindrical face of the first receptacle portion 56. A vertical seam strip 66 formed of a nylon joins the sidewall portion 60 to itself and runs the height of the first receptacle portion 56. The vertical seam strip 66 is turned inwardly and runs up and down on an inner cylindrical face of the first receptacle portion 56. An open top 68 of the first receptacle portion 56 is formed by an upper, horizontally running, circular seam strip 70 formed of nylon and covers upper edge portions of both the inner and outer cylindrical faces of the first receptacle portion 56.

The second receptacle portion 58 is formed generally in the shape of a box or parallelepiped. A parallelepiped means a shape having six faces, each a parallelogram. A parallelogram is a four-sided plane figure with opposite sides parallel such as a rectangle or a square. The second receptacle portion 58 includes a pair of opposite, seam strips 72, 74 formed of nylon. Each of the seam strips 72, 74 runs on three side edges of respective side faces 76, 78 of the second receptacle portion 58 and further runs along opposite edges of a cover 80 for the second receptacle portion 58. Each of the seam strips 72, 74 includes integral doubled-over portions 82, 84. On the fourth side edges of the respective side faces 76, 78 are stitched respective opposite seam strips 86, 88 formed of nylon which are joined to and between portions of respective seam strips 72, 74. The cover 80 may be quickly opened and closed via a hook (Velcro®) strip 90 having a nylon base cooperating with a loop (Velcro®) strip 92 having a nylon base. Strip 90 is stitched to and between one end portion of seam strips 72, 74 and strip 92 is stitched to and between the other end of seam strips 72, 74 and between seam strips 72, 74 and their respective doubled-over portions 82, 84.

It should be noted that when the aerobar bag 10 is fixed to the aerobar arrangement 12, the second receptacle portion 58 may deviate from the parallelepiped shape in that the side faces 76, 78 may bow outwardly and the cover 80 may further bow outwardly.

It should further be noted that the combined bag interior or space of the first and second receptacle portions preferably extends more than one-half of the length of the aerobar to maximize bag size while minimizing resistance to air flow.

The seam strips 72, 74 at portions 94, 96 affix the first and second receptacle portions 56 and 58 to each other. The receptacle portions 56 and 58 are effectively separated by a double mesh wall, with one mesh wall being defined by a portion of the sidewall 60 and by face 98 of the second receptacle portion 58.

A first set of tethers or straps 100 are stitched to the upper edge or seam strip 70 of the first receptacle portion 56. The first set includes four pairs of tethers or straps 100. Each pair includes a tether or strap portion 102 having Velcro® loops and a tether or strap portion 104 having Velcro® hooks. The looped portion 102 is wound about a portion of one of the elongate aerobars 20, 22 and the hooked portion 104 is placed over the looped portion 102 to affix the tether or strap pair 100 to its elongate aerobar 20 or 22. Accordingly, each tether or strap pair 100 is incrementally adjustable in effective length for wider or narrower aerobar arrangements 12. Each of the pairs of tethers or straps 100 is opposite another pair and spaced from an adjacent pair. Hence, the open top of the first receptacle portion may be held open to permit an article such as a water bottle 106 to be readily inserted and removed from the first receptacle portion. Further, with the opposite pairs of tethers or straps 100 working against each other, the tethers or straps 100 minimize lateral movement of the first receptacle portion 56 relative to the aerobar arrangement 12.

A second set of tethers or straps 108 extend from the second receptacle portion 58. Like with the tethers or straps 100, the tethers or straps 108 include looped Velcro® portions 110 and hooked Velcro® portions 112. The looped portion 110 is first wound about a portion of one of the oblique distal bar portions 50 and then the hooked portion 112 is attached to the looped portion 110. Accordingly, each tether or strap pair 108 is incrementally adjustable in effective length for wider or narrower aerobar arrangements 12. The tether or strap pairs 108 are opposite each other and thus work against each other to minimize lateral movement of the second receptacle portion 58 and to keep the sides 76, 78 from collapsing in on each other to maintain an open top to the second receptacle portion 58 when the cover 80 is open. It can be appreciated that the second tethers or straps 108 are disposed at a higher level than the tethers or straps 100 to maintain the aerobar bag 10 in a relatively horizontal position despite the oblique extension of bar portions 50. Further, it can be appreciated that the second receptacle portion 58 is offset relative to the first receptacle portion 56 to account for the oblique bar portions 50 and permit the tethers or straps 108 to extend from the upper edges or seam strips 86, 88.

A third tether or strap pair 114 also includes a hooked Velcro® strap portion 116 and a hooked Velcro® strap portion 118 for engagement, such as a wrapping as with tethers or straps 100, 108, to the conventional handle bar 14 or to the stem or to another portion of the bicycle frame 16 or to a fixture rigidly fixed to the bicycle frame. The third tether or strap portions 116 and 118 are stitched to and extend from seam strip 66 and extend generally at a right angle relative to the first tethers or straps 100. The third tether or strap 114 minimizes a longitudinal sliding of the aerobar bag 100 on the elongate bars 20, 22.

A fourth tether or strap 120 runs about a portion of the perimeter of the sidewall portion 60 of the first receptacle portion 56 to be drawn tightly against an article such as the water bottle 106 in the first receptacle portion 56. The fourth tether or strap 120 is stitched to seam strip portions 94, 96 and includes hooked Velcro® end portions 122 which engage looped Velcro® base portions 124 stitched to the sidewall 60 of the first receptacle portion 56 near where the third tether or strap 114 is stitched to the sidewall 60. Accordingly, the tether or strap 120, depending on where the hooked and looped portions 122 and 124 engage each other, is incrementally adjustable about an article such as the water bottle 106 in the first receptacle portion 56 which may have a greater or lesser circumference. When the hooked and looped portions 122 and 124 engage each other the tether or strap 120 effectively runs about the entire sidewall 60 of the first receptacle portion 56. The tether or strap 120 is spaced from the upper edge or seam strip 70.

Figure 6:
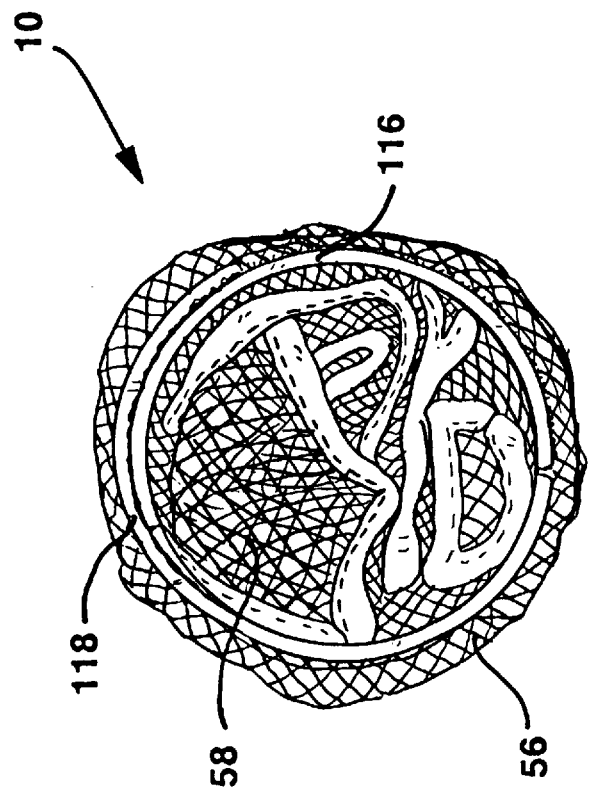
FIG. 6 shows a detail perspective view of the aerobar bag of FIG. 5 in a bundled, compact form.

FIG. 6 indicates that the bag 10 may be bundled for storage into a relatively small compact form. If desired, one of the strap pairs, such as pair 114 formed of strap portions 116 and 118, may be wrapped about the bundled bag 10 and engaged to each other such as with the hooks and loops to hold the bag 10 in its bundled state.

Figure 7:
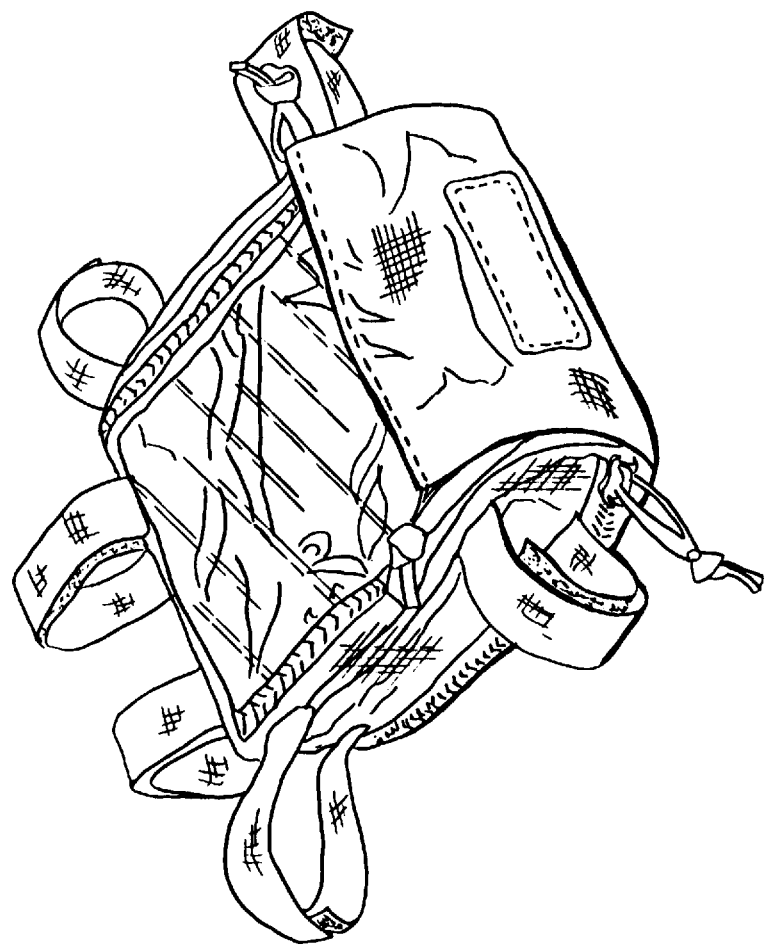
FIG. 7 shows a prior art aerobar bag.

As to FIG. 7, it should be noted that the bag shown does not include two receptacle portions with each receptacle portion of a size to permit the insertion of the hand of an adult. Nor is any portion of the bag formed of a mesh. Nor does such a bag include a first tether or tethers extending from a first receptacle portion and a second tether or tethers extending from a second receptacle portion.

As to water bottles which may be used in place of water bottle 106, the following documents are hereby incorporated by reference in their entireties: the Moeller et al. U.S. Pat. No. 5,497,920 issued Mar. 12, 1996 and the journal article authored by WALLACK, R. M., "Speed Suckers," *Triathlete=1*, May, 1996, pages 62–65. These documents show water bottles with straws. It should be noted that it is preferred to utilize with the present bag 10 a water bottle with a straw, such as straw 130 indicated in FIG. 1, extending therefrom such that the rider may drink (via the water bottle being in the first receptacle portion) and eat (via food stored in the second receptacle portion) without moving from the aerodynamic position. It should be noted that the straw 130 may extend to be adjacent to the bottom of the interior of the water bottle.

As to the aerobar arrangement or aerobars which may be used with the present invention, the following journal articles are hereby incorporated by reference in their entireties: WALLACK, R. M., "Aerobirth," *Triathlete*, July, 1996, pages 60–62 and "Aerobar Round-Up," *Triathlete*, July, 1996, pages 63–66 (author unknown).

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

I claim:

1. A bicycle aerobar arrangement and bag combination, with the combination comprising:
   a) a bicycle aerobar arrangement, with the bicycle aerobar arrangement being adapted for engagement to a bicycle having a handle bar and a direction of travel, with the handle bar being engaged to the bicycle generally perpendicular to the direction of travel and such that the handle bar may be used to steer the bicycle, with the aerobar arrangement comprising a pair of elongate aerobar portions extending generally in the direction of travel and with each of the elongate aerobar portions being engaged to the handle bar such that each of the aerobar portions lies forwardly of the handle bar and such that the aerobar arrangement may be used to steer the bicycle;
   b) a bag engaged to and between the elongate aerobar portions, with the bag comprising first and second receptacle portions separated by a divider, with each of the receptacle portions being of a sufficient size to permit the insertion of a hand of an average sized adult, and with one of the receptacle portions disposed forwardly of the other receptacle portion to maximize bag size while minimizing resistance to air flow; and
   c) wherein one of the receptacle portions further comprises a perimeter and a means which allows at least a portion of the perimeter to be variable in length such that the perimeter of such receptacle portion may be reduced in length whereby such receptacle portion may be tightened about an article in such receptacle portion.

2. A bicycle aerobar arrangement and bag combination, with the combination comprising:
   a) a bicycle aerobar arrangement, with the bicycle aerobar arrangement being adapted for engagement to a bicycle having a handle bar and a direction of travel, with the handle bar being engaged to the bicycle generally perpendicular to the direction of travel and such that the handle bar may be used to steer the bicycle, with the aerobar arrangement comprising a pair of elongate aerobar portions extending generally in the direction of travel and with each of the elongate aerobar portions being engaged to the handle bar such that each of the aerobar portions lies forwardly of the handle bar and such that the aerobar arrangement may be used to steer the bicycle;
   b) a bag engaged to and between the elongate aerobar portions, with the bag comprising first and second receptacle portions separated by a divider, with each of the receptacle portions being of a sufficient size to permit the insertion of a hand of an average sized adult, and with one of the receptacle portions disposed forwardly of the other receptacle portion to maximize bag size while minimizing resistance to air flow; and
   c) wherein the first receptacle portion is formed in a cylindrical shape and wherein the second receptacle portion is formed in a parallelepiped shape.

3. A bicycle aerobar arrangement and bag combination, with the combination comprising:
   a) a bicycle aerobar arrangement, with the bicycle aerobar arrangement being adapted for engagement to a bicycle having a handle bar and a direction of travel, with the handle bar being engaged to the bicycle generally perpendicularly to the direction of travel and such that the handle bar may be used to steer the bicycle, with the aerobar arrangement comprising a pair of elongate aerobar portions extending generally in the direction of travel and with each of the elongate aerobar portions being engaged to the handle bar such that each of the elongate aerobar portions lies forwardly of the handle bar and such that the aerobar arrangement may be used to steer the bicycle, with the aerobar arrangement having a proximal end engaged to the handle bar and a distal end and with the distance between the ends defining a length of the aerobar arrangement, and with each of the elongate aerobar portions including a proximal portion and a distal oblique portion;
   b) a bag engaged to and between the elongate aerobar portions and comprising:
      i) first and second receptacle portions;
      ii) first and second sets of tethers, with the first set of tethers extending from the first receptacle portion to proximal portions of the elongate aerobar portions, with the second set of tethers extending from the second receptacle portion to the distal oblique portion;
      iii) at least a third tether, with the at least third tether extending from the bag to a portion of the handle bar such that the first and second sets of tethers minimize lateral movement of the bag and the third tether minimizes longitudinal movement of the bag; and
      iv) wherein each of the tethers is adjustable in length to accommodate aerobar arrangements of different sizes;
   c) and further comprising at least a fourth tether and wherein one of the receptacle portions includes a perimeter, with the at least fourth tether being drawable tightly about the perimeter such that the perimeter may be reduced in length whereby an article may be held tightly in such receptacle portion.

4. The combination of claim 3 wherein the first and second sets of tethers are offset in the vertical direction to be disposed at different altitudes when the bag is engaged to the aerobars to maintain a horizontal orientation to the bag.

5. A bicycle aerobar arrangement and bag combination, with the combination comprising:
   a) a bicycle aerobar arrangement, with the bicycle aerobar arrangement being adapted for engagement to a bicycle having a handle bar and a direction of travel, with the handle bar being engaged to the bicycle generally perpendicularly to the direction of travel and such that the handle bar may be used to steer the bicycle, with the aerobar arrangement comprising a pair of elongate aerobar portions extending generally in the direction of travel and with each of the elongate aerobar portions being engaged to the handle bar such that each of the elongate aerobar portions lies forwardly of the handle bar and such that the aerobar arrangement may be used to steer the bicycle, with the elongate aerobar portions being transverse of each other, with the aerobar arrangement having a proximal end engaged to the handle bar and a distal end and with the distance between the ends defining a length of the aerobar arrangement, and with each of the elongate aerobar portions including a proximal portion and a distal oblique portion;

b) a bag, with the bag comprising a receptacle portion which comprises a material having perforations therein to minimize collection of moisture in the receptacle, with the bag further comprising a cover for the receptacle portion;

c) first and second sets of straps extending from the receptacle portion to the aerobar arrangement for attaching the bag to the aerobar;

d) a third strap extending from the bag to the handle bar such that the first and second sets of straps minimize lateral movement of the bag and such that the third strap minimizes longitudinal movement of the bag;

e) and further comprising in combination at least a fourth strap and a bottle, and wherein the fourth strap extends from the receptacle portion and is wrapped about at least a portion of a periphery of the bottle.

6. The combination of claim 5 wherein each of the straps is adjustable in length to accommodate different aerobar arrangements.

* * * * *